March 18, 1941.   M. C. TEAGUE ET AL   2,235,690
LAMINATED ELASTIC FABRIC AND THE METHOD OF MAKING THE SAME
Filed Nov. 30, 1937   2 Sheets-Sheet 1
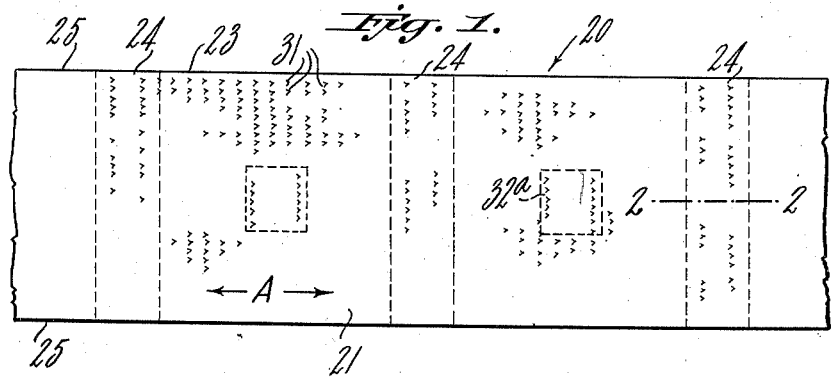
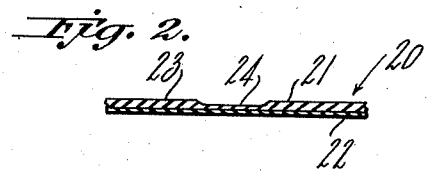
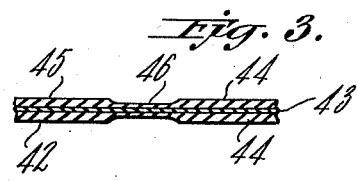
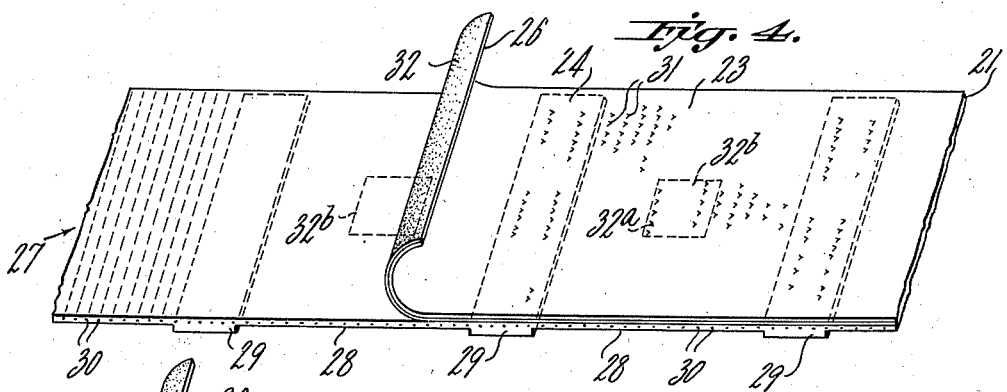
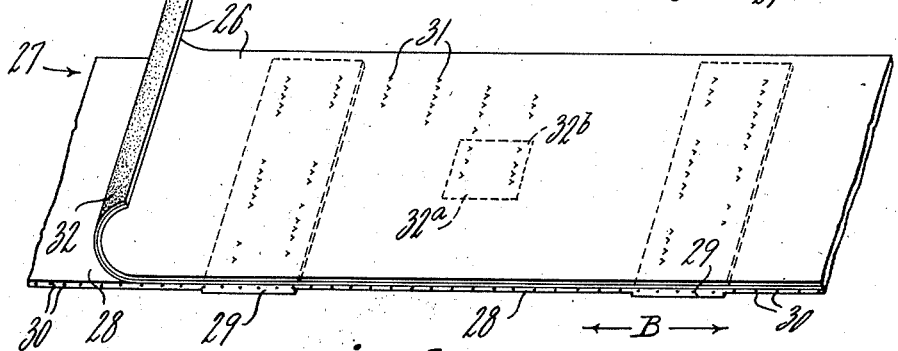
INVENTORS
MERWYN C. TEAGUE
THOMAS G. HAWLEY, JR.
BY
ATTORNEYS Patented Mar. 18, 1941

2,235,690

UNITED STATES PATENT OFFICE 2,235,690

LAMINATED ELASTIC FABRIC AND THE METHOD OF MAKING THE SAME

Merwyn C. Teague, Ridgewood, N. J., and Thomas G. Hawley, Jr., Naugatuck, Conn., assignors, by mesne assignments, to United States Rubber Company, New York, N. Y., a corporation of New Jersey Application November 30, 1937, Serial No. 177,214

13 Claims. (Cl. 154—2)

This invention relates to improved laminated elastic fabrics having different elastic properties and surface appearances in some areas than in others. The invention also relates to the method of manufacturing such fabrics, and is a continuation in part of application Serial No. 151,622, filed July 2, 1937.

The fabric embodying this invention comprises one or more laminae of thread fabric which is or are elastically bonded to a lamina of rubber. The latter lamina may be formed from a permanent coating of rubber adhesive and/or a preformed rubber sheet. The varied elastic extensibility and appearance of the laminated fabric are produced by super-relaxing the lamina or laminae of thread fabric more in some areas than in others, and elastically retaining the thread fabric in such condition by the lamina of rubber bonded thereto. Laminated fabrics having such characteristics are useful in the manufacture of wearing apparel.

The thread fabric is super-relaxed by securing it to a stretched elastic surface of an elastic sheet, hereinafter referred to as a super-relaxing sheet, and permitting the stretched surface to contract and thereby contract the thread fabric to substantially the same extent.

It is intended that wherever the term "super-relaxed" is used herein it shall mean the contracted condition of the thread fabric in any specified area as compared to the more extended condition of the thread fabric in such area at the time it was initially secured to the stretched surface of the super-relaxing sheet. It is also intended that wherever the term "thread fabric" is used herein it shall mean a textile fabric having a knitted or loosely woven construction or combination of such constructions, which are capable of being super-relaxed.

The laminated fabric is manufactured by securing a web of thread fabric, to be incorporated as a lamina in the laminated fabric, to the surface of a super-relaxing sheet composed of areas having different degrees of elastic elongation when subjected to the same tension. At the time the thread fabric is secured, the super-relaxing sheet is under tension which extends the areas having the greater elastic extensibility to a greater degree than the areas which possess the lesser degree of extensibility, and the web of thread fabric may be extensible or it may be substantially non-extensible in the direction of the tension on the super-relaxing sheet. Upon the release of the tension on the super-relaxing sheet the areas of the sheet having the greater degree of elastic extensibility contract and super-relax the portions of the lamina of thread fabric secured thereto to a greater degree than the portions of the lamina of thread fabric secured to the areas having a lesser elastic extensibility. In the event the super-relaxing sheet is provided with areas having elastic extensibility and other areas having substantially no extensibility in the direction of tension to which it is subjected, and the web of thread fabric is substantially non-extensible in the direction of the tension at the time of being secured to the super-relaxing sheet, then upon the release of the tension, the portions of the thread fabric secured to the elastic areas of the super-relaxing sheet are super-relaxed while the portions secured to the areas having substantially no elastic extensibility are retained in their original non-extensible conditions.

The web of thread fabric may be secured to the super-relaxing sheet by the permanent coating of rubber adhesive which remains on the thread fabric and retains it in the super-relaxed condition or the thread fabric may be secured to the super-relaxing sheet by a coating of temporary adhesive or by mechanical means. Where either the temporary adhesive or mechanical means is employed to secure the thread fabric to the super-relaxing sheet while stretched, the permanent coating of rubber adhesive may be applied to the outer surface of the thread fabric either before or after the tension on the super-relaxing sheet has been released to super-relax the thread fabric.

In any of the cases in the immediately preceding paragraph, the thread fabric with the permanent coating of rubber adhesive adhering thereto may be removed from the super-relaxing sheet after the permanent adhesive coating has been strengthened sufficiently to retain the thread fabric in its super-relaxed, original, or non-extensible conditions at the time of removal and also after it has been strengthened sufficiently to resist permanent deformation during the removal. Such strength may be imparted to the adhesive by drying it and if necessary by allowing it to stand and/or vulcanizing it after drying.

Where the thread fabric is secured to the super-relaxing sheet by rubber adhesive inserted between the thread fabric and the surface of the super-relaxing sheet it may be vulcanized to the surfaces of the thread fabric and the sheet and thereby incorporate the sheet as a part of the laminated fabric. In such event, the sheet and the adhesive will constitute the rubber lamina.

Heretofore bands having two-way elasticity alternating with bands having very little elasticity in the direction of the distance between the bands have been provided in fabrics by the use of special knitted constructions containing rubber thread. The bands have been either knitted on separate knitting machines and subsequently united, or have been unitarily knitted on a single machine of costly construction. If done on a single machine, special and complicated mechanisms were required to change the stitch to provide the different elastic characteristics in the bands. The cost of production of the fabric by either of the prior procedures is relatively high as compared to the manufacture of knit fabrics by the use of a single standard knitting machine.

The manufacture of the fabrics embodying the present invention is greatly simplified by the use of standard knitted or loosely woven thread fabrics, which may be made upon standard knitting or weaving machines and thereby eliminate the use of specially constructed textile machines. Such manufacture is further simplified as the use of rubber thread in the fabrics is not required.

The foregoing features and other characteristics of this invention are more fully described in the following description and shown in the accompanying drawings in which:

Fig. 1 is a plan view of one form of a laminated fabric embodying this invention in which the fabric is shown in a relaxed condition;

Fig. 2 is a fragmentary cross section of the fabric taken on line 2—2 of Fig. 1;

Fig. 3 is a fragmentary cross section of a laminated fabric containing two laminae of thread fabric;

Fig. 4 is an isometric view of the laminated fabric shown in Fig. 1 while associated with the super-relaxing sheet;

Fig. 5 is an isometric view of the laminated fabric shown in Fig. 4 while associated with the super-relaxing sheet in a stretched condition during the process of manufacture.

Figure 6:
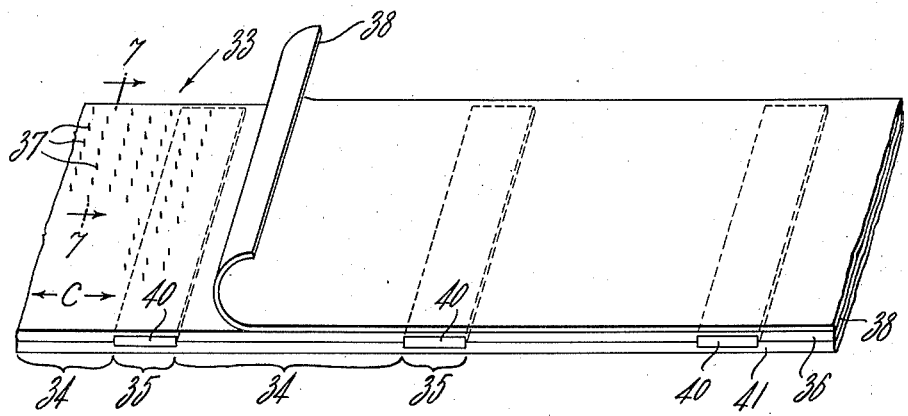
Fig. 6 is an isometric view of a modified form of super-relaxing sheet; having a web of thread fabric mechanically secured thereto.

Referring to Figs. 1 and 2 the laminated elastic fabric 20 illustrated therein comprises a lamina of thread fabric 21 elastically bonded to a lamina of rubber 22. The lamina of thread fabric 21 is super-relaxed to a greater degree in the areas or bands 23 than in the areas or bands 24 and squares 32a in the lengthwise direction indicated by the double arrow A. As a result of the different degrees of super-relaxing, the bands 23 are provided with different elastic properties and a different surface appearance from the bands 24 and squares 32a.

Referring to Fig. 2 it will be noted that the portions of the thread fabric 21 in the bands 23 is thicker than the fabric 21 in the bands 24 as a result of the thread fabric being super-relaxed to a greater degree in the bands 23 than in the bands 24. The increased thickness of the thread fabric lamina resulting from being super-relaxed is directly in proportion to the amount the thread fabric is super-relaxed and in inverse proportion to the size of the mesh of the thread fabric construction at the time of being adhered to the super-relaxing sheet. If the rubber forming the rubber lamina 22 is applied evenly to the thread fabric 21 after it has been super-relaxed, the rubber lamina in the finished laminated fabric will have a uniform thickness as shown in Fig. 2. But if the rubber is applied prior to super-relaxing the thread fabric, the rubber lamina in the finished laminated fabric will be thicker in the bands 23 than in the bands 24. In either of the previously stated cases the laminated fabric has greater elastic extensibility in the bands 23 than in the bands 24 when subjected to tension in the direction of the arrow A. But in the latter case where the rubber is thicker in the bands 23 than in the bands 24 the rubber in the first bands will offer a greater resistance to stretch, thereby imparting a greater elastic contractive force to bands 23 in the laminated fabric 20 than in the bands 24. The areas of the bands 23 and 24 and squares 32a may be of any desired shape or size and may be arranged as desired to produce the desired elastic properties and visual effects in the laminated fabric.

The laminated fabric 20 may be made as will be more particularly explained hereinafter so that the bands 24 have no or some elastic extensibility but less than the elastic extensibility of the bands 23. Where the thread fabric has initial extensibility, in the direction transverse to the arrow A when secured to the super-relaxing sheet, the laminated fabric 20 will also have elastic extensibility in such direction, and if initially non-extensible in such direction the fabric 20 will be non-extensible in such direction. Where a transversely extensible thread fabric is employed, the bands 23 may be provided with two-way stretch and the bands 24 with only one way stretch, extending in the direction transverse to the arrow A, or the bands 24 may be provided with two-way stretch but having less stretch than the bands 23 in the direction of the arrow A. It will be understood that where the thread fabric has no stretch in the direction transverse to the arrow A and no super-relaxing takes place in such direction, the laminated fabric will have one-way stretch in the bands 23 and one-way or no stretch in the bands 24. In any event the stretch in the bands 24 will be less than in the bands 23.

A method of manufacturing the laminated elastic fabric 20, shown in Figs. 1 and 2, is illustrated in Figs. 4 and 5. Referring to Fig. 5, a web 26 of thread fabric, to be incorporated as the lamina 21 (Fig. 2), is secured to the surface of an elastic super-relaxing sheet 27 while the sheet is subjected to tension in the direction indicated by the double arrow B and while the web 26 is either in an extensible or a substantially non-extensible condition in such direction.

The super-relaxing sheet 27 is provided with relatively thin bands 28 and thick bands 29 of elastic rubber. When the sheet 27 is subjected to tension in the direction of the arrow B, the bands 28 being thinner than the bands 29, the former elongate to a greater extent than the latter per linear unit extending in the direction of the tension. Such unit of elongation in the bands 29 may be made substantially zero, if the difference between the thickness of the bands 28 and 29 is sufficiently great, and in such case all of the elongation will occur in the bands 28. It is known that rubber when stretched contracts in a direction transverse to the direction of stretch and that for a given thickness the contraction is in proportion to the amount of stretch within certain limits. For the purpose of causing the super-relaxing sheet 27 to retain substantially a constant width while being stretched and relaxed, substantially non-extensible threads 30, or similar filaments extending transversely to the stretch, are incorporated in the super-relaxing sheet 27 while the sheet is elongated to a greater extent than at the time when the thread fabric to be super-relaxed is secured thereto. The non-extensible threads prevent the super-relaxing sheet from expanding transversely when the tension is released and retains the sheet at the same width while it is subsequently stretched to the foregoing extent and relaxed.

Upon releasing the tension on the super-relaxing sheet 27, the portions of the thread fabric web 26 secured to the more elongated bands 28 are super-relaxed to a greater degree than the portions secured to the less elongated bands 29, as shown in the bands 23 and 24 respectively in Figs. 1 and 4.

The darts 31 represent closely spaced points on the surface of the thread fabric, for example, the loops in a knit fabric in which the darts extend in the direction of the wales, or for example the cross-over points of the threads in a woven fabric. The spacing between the darts indicates the relative positions of such points. Referring to Fig. 5 the darts are uniformly widely spaced at the time the thread fabric web 26 is secured to the super-relaxing sheet 27. Referring to Fig. 4, illustating the relaxed condition of the super-relaxing sheet 27 after the tension has been released, the darts 31 are more closely spaced in the bands 23 than in the bands 24, which indicates the degree the thread fabric is super-relaxed in the respective bands.

Figure 7:
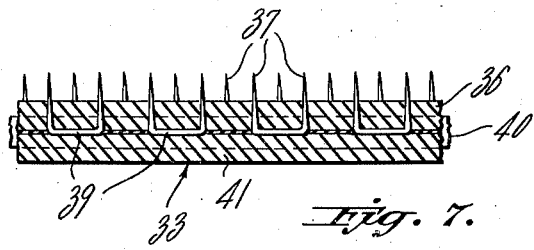
Fig. 7 is an enlarged cross-sectional view of the modified form of super-relaxing sheet taken on line 7—7 of Fig. 6.
Figure 8:
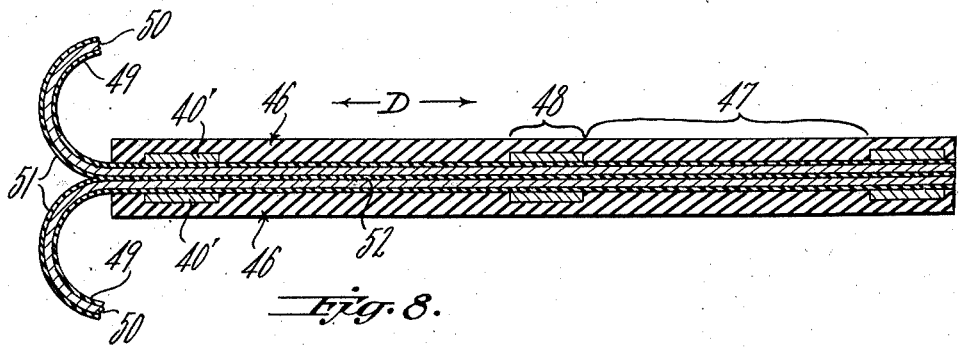
Fig. 8 is a cross-sectional view of a laminated fabric having a lamina of rubber bonded between two laminae of thread fabric and positioned between two super-relaxing sheets during its process of manufacture.

As shown in Figs. 4 and 5 the web 26 of thread fabric is secured to the super-relaxing sheet by a coating 32 of rubber adhesive applied either to the web 26 of the thread fabric, or to the surface of the super-relaxing sheet 27, or to both, or as shown in Figs. 6, 7 and 8, the thread fabric web may be secured to the super-relaxing sheet by a temporary adhesive or by mechanical means.

Where the rubber adhesive is used as a securing means it is preferably dried to a tacky condition before the webs 26 are adhered to the surfaces of the super-relaxing sheet to prevent the adhesive from penetrating the thread fabric to such an extent that it will offer a substantial resistance to the contraction of the super-relaxing sheet 27, or to such an extent that the adhesive will show on the outer surface of the thread fabric lamina. After the tension is released on the super-relaxing sheet 27, the adhesive must be further treated until it is sufficiently strong to hold the thread fabric in a super-relaxed condition. Such treatment may consist of further drying the adhesive or in some cases of allowing it to stand and/or vulcanizing it after drying. The adhesive 32 is then removed with the thread fabric web 26, which it is adhered to, and then vulcanized, if the vulcanization has not been previously carried to the desired state. After removal the web 26 of thread fabric constitutes the lamina 21 and the adhesive coating constitutes the rubber lamina 22 as shown in Fig. 2.

Instead of removing the thread fabric web 26 with its rubber adhesive coating 32 from the super-relaxing sheet 27, the web 26 may be combined with the super-relaxing sheet 27 by vulcanizing the adhesive between the web and the sheet, and thereby produce a finished laminated fabric. In such practice the super-relaxing sheet is preferably made very thin, and when it is desired to produce transverse elasticity in the fabric the transverse threads 30 may be omitted from the sheet 27. In order to render the laminated fabric substantially non-extensible in both directions in some areas 32a in Fig. 4 and elastically extensible in either or both directions in adjacent areas, non-extensible inserts 32b of fabric are incorporated in the transversely elastic super-relaxing sheet 27, and a transversely extensible thread is combined with the stretched sheet.

A different form of super-relaxing sheet 33 is illustrated in Figs. 6 and 7. The sheet is provided with elastically extensible bands 34 and less extensible or substantially non-extensible bands 35. The super-relaxing sheet 33 comprises a layer 36 of elastic sheet rubber, or other elastically extensible material comprising textile threads and rubber. The sheet 36 is provided with closely spaced points or small pins 37 extending through its surface for mechanically securing a thread fabric web 38 thereto. The points 37 are preferably anchored in the sheet 36 by driving double pointed tacks 39 through the surface of the sheet while the sheet is stretched, so that the rubber will obtain a better grip upon the points and the points will be more closely spaced when the sheet is relaxed. The points 37 are preferably staggered so that they may be arranged closer together, and they should be of such a length that they will extend into but not through the thread fabric to such an extent as to interfere with the application of the rubber adhesive to be applied to the upper surface of the thread fabric as hereinafter described.

The bands 35 are rendered less extensible or substantially non-extensible in the direction of the arrow C by the transversely extending inserts 40 which are interposed between and combined with the elastic rubber sheet 36 and the backing up elastic rubber sheet 41. The sheet 36 is elastically bonded to the sheet 41. For the purpose of making the bands 35 with some extensibility but less than the bands 34, the inserts 40 are made with rubber having less elasticity than the rubber sheets 36 and 41. For the purpose of making the bands 35 substantially non-extensible the inserts may be made of thin metal, flexible hard rubber, wood or fabric or other fibrous or like materials.

In the manufacture of the elastic laminated fabric by the use of the sheet 33, it is stretched in the direction of the arrow C and the web of thread fabric 38 is placed on the pins while the sheet 33 is so stretched. A coating of rubber adhesive is applied to the exposed surface of the thread fabric while the sheet 33 is under tension or the tension may be released and the coating of adhesive may be applied. Upon the release of the tension, the pin points 37 in the bands 34 are brought closer together than in the bands 35, and thereby cause the thread fabric 38 in the bands 34 to be super-relaxed to a greater degree than in the bands 35. After drying the adhesive to the proper extent, the fabric with the adhesive adhered thereto may be removed from the sheet 33 and vulcanized as described in reference to Figs. 1, 4 and 5 to produce the laminated fabric 20.

The laminated fabric 42 illustrated in Fig. 3 and containing a lamina of rubber 43 bonded to and between the laminae 44 of thread fabric may be made by stretching a sheet of the laminated fabric 20 (Fig. 2) and adhering thereto, with rubber adhesive, a web of thread fabric, or by stretching two sheets of the laminated fabric 20 and adhering the rubber laminae together, with a rubber adhesive, so that the elastically extensible and less elastically extensible bands 23 and 24 match with one another to produce the elastically extensible bands 45 and the less elastically extensible bands 46.

An alternative method of manufacturing the laminated fabric 42, shown in Fig. 3, is illustrated in Fig. 8. In accordance with this alternate method two super-relaxing sheets 46, having alternating elastically extensible bands 47 and substantially non-extensible bands 48, are employed. The sheets 46 are made of rubber or other elastically extensible material having transversely extending inserts 40' incorporated therein, and of the character described in reference to Fig. 6 which are non-extensible in the direction of the arrow D. In carrying out the method, the sheets 46 are subjected to tension to elongate the bands 47 in the direction of the arrow D. Temporary coatings 49 of adhesive, such as starch or glue are applied to either the outer surfaces of the webs 50 of thread fabric, or to the inner surfaces of the super-relaxing sheets 46 or to both. A permanent coating 51 of rubber adhesive is applied to one or both of the inner surfaces of the thread fabric 50. The webs 50 so treated are then placed between the tensioned super-relaxing sheets 46 which are pressed together to produce bonds between the inner surfaces of the webs 50, and the outer surfaces of such webs and the inner surfaces of the super-relaxing sheets. For the purpose of preventing the adhesive coatings 49 and 51 from striking through the thread fabric, they are preferably dried to a tacky condition before the super-relaxing sheets and the webs of thread fabric are plied together. The tension on the super-relaxing sheets is released, and the portions of the webs 50 of thread fabric adhered to the bands 47 are super-relaxed, while the portions of the webs secured to the bands 48 are not. After the permanent coating 51 of rubber adhesive has been dried to a condition where it will retain the web of thread fabric in the super-relaxed condition without the aid of the sheets, the super-relaxing sheets 46 are removed from the laminated fabric. The webs 50 of thread fabric are then retained in their condition at the time of removal by the lamina 52 of rubber formed from the coatings 51. The rubber lamina 52 may then be vulcanized. The temporary adhesive is preferably washed from the fabric after vulcanizing the rubber lamina 52.

To facilitate the drying of the adhesives between the super-relaxing sheets 46, the material of which they are composed may be made with holes extending therethrough. Also one of the single webs of thread fabric 50 may be combined with one of the super-relaxing sheets 46 by substituting the permanent adhesive 51 for the temporary adhesive 49 and eliminating the adhesive 51 from between the webs 50.

The laminated fabric 42 illustrated in Fig. 3 may also be made in a single run or super-relaxing operation without the use of the temporary adhesive coating method described in reference to Fig. 8. This may be done by substituting a pair of super-relaxing sheets similar to the sheets 33 in Fig. 6, for the super-relaxing sheets 46 in Fig. 8. The process is carried out with the substituted sheets in the same manner as described in reference to Fig. 8, except the steps of applying and removing the temporary adhesive coatings 49 are omitted. The inner surfaces of the super-relaxing sheets containing the points 37 are pressed in contact with the outer thread fabric surfaces while the elastic bands are stretched. The points extend into the fabric and upon the release of the tension in the super-relaxing sheets, the points in the elastic bands cause the thread fabric webs contacting therewith to be super-relaxed.

If it is desired to make a porous laminated fabric the points 37 may extend through the thread fabric web and the intermediate coating of permanent rubber adhesive which forms the rubber lamina 43 in the laminated fabric 42 (Fig. 3). After the rubber adhesive is dried and the points are pulled out through the removal of the super-relaxing sheets, the rubber lamina 43 will be left in a porous condition.

The laminated fabrics made by the use of the super-relaxing sheets having alternate extensible and non-extensible bands, may be produced so that the bands 24 and 46 of the laminated fabric (Figs. 2 and 3) falling opposite to the non-extensible bands of the super-relaxing sheet are provided with some elastic extensibility or substantially no extensibility as may be desired. For example, if the thread fabrics have some extensibility when secured to the super-relaxing sheets, the bands 24 and 46 will be elastically extensible but to a less extent than the bands 23 and 45. If the thread fabrics when so secured have no extensibility, the bands 24 and 46, likewise, will have substantially no extensibility.

The laminated elastic fabric having some areas super-relaxed more than others may be made on a still further type of super-relaxing sheet. The sheet may be made of an elastic rubber composition normally having uniform elastic extensibility in all of its areas when subjected to the same tension. In the manufacture of fabric with such sheet, the temperature of certain areas of the sheet is reduced in some areas below the temperature of other areas and to such an extent and differential that the reduced temperature areas are rendered less extensible than the higher temperature areas. The reduction in temperature may be effected by applying an efficient heat conductive refrigerated surface to the surface of the rubber to be rendered less extensible, or by applying to the rubber surfaces a refrigerating rubber non-solvent fluid, such as for example, acetone or alcohol cooled directly or indirectly by solidified carbon dioxide.

The elastic extensibility of the rubber when cooled varies with the rubber composition, particularly the combined sulphur content, which lowers the temperature at which the rubber is rendered less extensible as the sulphur content is increased. It has been found that after portions of a rubber sheet about .06" in thickness and containing about .5% of combined sulphur have been subjected to an alcohol bath for one minute at the temperatures indicated in column 1 of the table below, while other portions have been retained at about 20° C., and the sheet is subjected to a tension which will stretch the untreated portions to a percentage elongation shown in column 2, the treated portion will stretch to the percentage elongation shown in column 3.

| Col. 1, temperature of alcohol bath | Col. 2, percentage elongation of untreated portion | Col. 3, percentage elongation of treated portion |
| --- | --- | --- |
| °C. | | |
| −44 | 150 | 100 |
| −50 | 150 | 75 |
| −60 | 150 | 40 |
| −69 | 150 | 0 |

After so treating the super-relaxing sheet it may be utilized for making the laminated fabric as described in reference to Figs. 4 and 5.

A laminated fabric comprising areas which have elastic extensibility in one direction and areas which have relatively no elastic extensibility in such direction is formed by first stretching under tension a super-relaxing sheet having bands which are alternately elastic and substantially non-elastic in the direction of the tension, then adhering a substantially non-extensible but super-relaxable layer of thread fabric to said surface with a layer of rubber adhesive. This is followed by releasing sufficient tension on said sheet to super-relax the portions of thread fabric adhered to the elastic bands and retaining said thread fabric portions in a non-extensible condition adhered to said substantially non-elastic bands of said surface. The rubber adhesive is then dried and removed while adhered to said fabric from said super-relaxing sheet and finally the adhesive is vulcanized to elastically retain said super-relaxed and non-extensible bands of the thread fabric in such conditions when the laminated fabric is in its normal relaxed condition. Thus the rubber lamina in the area of no relative elastic extensibility is retained by said thread fabric in a relatively non-extensible condition.

In the examples previously described the finished laminated fabric may be made elastically extensible or non-extensible in both bands in the direction transverse to the direction of the distance between the bands. If the thread fabric is extensible in a transverse direction at the time of being secured to the super-relaxing sheet, the finished laminated fabric prepared on same will be elastic likewise in such direction, and if non-extensible, the finished fabric will be non-elastic in such direction. Knitted thread fabrics are suitable for use in making laminated fabrics having such transverse elasticity, while woven thread fabrics are suitable for rendering the laminated fabric non-elastic in such direction, when the warp or weft threads are laid on the super-relaxing sheet in the direction the sheet is stretched.

The permanent rubber adhesive which enters into the rubber lamina of the laminated fabric preferably possesses the property of not softening at the vulcanizing temperatures used. An example of such an adhesive is given in the formula below.

|  | Parts by weight |
|---|---|
| Centrifuged latex rubber | 100.0 |
| Water in centrifuged latex | 66.7 |
| Fixed alkali | .5 |
| Colloidal sulphur (sulphur 2 parts) | 3.3 |
| Colloidal zinc oxide (ZnO 2 parts) | 5.0 |
| Antioxidant emulsion (antiox. 1 part) | 5.1 |
| Accelerator paste (acceler. 1 part) | 2.3 |
| Total | 182.9 |

Total solids 58.8%; conc. viscosity 43.5 centipoises.

While several forms of the invention have been described in detail herein it will be understood that changes in such details may be made without departing from the spirit of the invention and it is intended that the invention extend to the scope of the appended claims.

Having thus described our invention what we desire to protect by Letters Patent is:

1. A laminated fabric comprising areas which have elastic extensibility in one direction and areas which have relatively no elastic extensibility in such direction, said fabric comprising a lamina of thread fabric and a lamina of elastic rubber bonded to said lamina of thread fabric, the lamina of thread fabric in the first named areas being normally extensible and retained in a super-relaxed condition by said rubber lamina, and the lamina of thread fabric in the second named areas being relatively non-extensible and retaining said rubber lamina in a relatively non-extensible condition in said direction of elasticity of the first named areas.

2. A laminated elastic fabric having areas which are elastic in all directions and areas which are non-elastic in at least one direction, said fabric comprising a lamina of thread fabric and a lamina of elastic rubber bonded to said lamina of thread fabric, the lamina of thread fabric in the first named areas being normally extensible in all directions and retained in a super-relaxed condition in one direction by said rubber lamina, and the lamina of thread fabric in the second named areas being non-extensible in the super-relaxed direction of the first named areas and retaining said rubber lamina in a non-extensible condition in the super-relaxed direction of the first named areas.

3. A laminated elastic fabric having spaced bands extending across said fabric which are non-elastic in the direction of the distance between said bands, a lamina of rubber interposed between and bonded to two laminae of thread fabric, said laminae of thread fabric being normally extensible and held by said rubber in a super-relaxed condition in the space between said bands, and said laminae of thread fabric being non-extensible in the areas of said non-elastic bands in the direction of the distance between the bands and holding said rubber lamina in a non-extensible condition in such direction.

4. The method of manufacturing laminated elastic fabric having some areas provided with more elastic extensibility than others, said method comprising the steps of stretching a super-relaxing sheet more in some areas than in others, adhering a web of thread fabric to said stretched super-relaxing sheet with a rubber adhesive, releasing a substantial amount of the stretching force and thereby causing the super-relaxing sheet to contract along the lines of stretch and super-relax said thread fabric more in some areas than others, and vulcanizing said adhesive to said thread fabric and to said super-relaxing sheet.

5. The method of manufacturing laminated elastic fabric having some areas provided with more elastic extensibility than others, said method comprising the steps of stretching a super-relaxing sheet more in some areas than in others, adhering a web of thread fabric to said stretched super-relaxing sheet with a rubber adhesive, releasing a substantial amount of the stretching force and thereby causing the super-relaxing sheet to contract along the lines of stretch and super-relax said thread fabric more in some areas than others, drying said adhesive until its strength is increased to the extent required to hold said thread fabric in its super-relaxed condition, removing said adhesive secured to said thread fabric from the super-relaxing sheet, and vulcanizing said adhesive to said web of thread fabric.

6. The method of manufacturing laminated elastic fabric having some areas provided with more elastic extensibility than others, said method comprising the steps of stretching a super-relaxing sheet more in some areas than in others, applying rubber adhesive to a web of thread fabric, drying said adhesive to a tacky condition, adhering said web of thread fabric to said stretched-super-relaxing sheet with said tacky adhesive, releasing a substantial amount of the stretching force and thereby causing the super-relaxing sheet to contract along the lines of stretch and super-relax said thread fabric more in some areas than others, drying said adhesive until its strength is increased to the extent required to hold said thread fabric in its super-relaxed condition, removing said adhesive with said thread fabric from the super-relaxing sheet, and vulcanizing said adhesive to said web of thread fabric.

7. The method of manufacturing laminated elastic fabrics comprising the steps of stretching an elastic preformed rubber web more in some areas than in others, adhering a web of thread fabric to said rubber web with a rubber adhesive, releasing the stretching force applied to said web of rubber and thereby super-relaxing the lamina of fabric to a greater degree in the areas adhered to the areas of the rubber lamina stretched to the greater degree, and super-relaxing the fabric to a lesser degree in the areas adhered to the rubber stretched to the lesser degree.

8. The method of manufacturing laminated elastic fabric having alternate elastic and substantially non-elastic bands in respect to elongation in the direction of the distances between said bands, said method comprising the steps of stretching under tension a surface having bands which are alternately elastic and substantially non-elastic in the direction of the tension, adhering a substantially non-extensible but super-relaxable layer of thread fabric to said surface with a layer of rubber adhesive, releasing sufficient tension on said surface to super-relax the thread fabric adhered to the elastic bands of said surface and retaining in a non-extensible condition said thread fabric portion adhered to said substantially non-elastic bands of said surface, and vulcanizing said adhesive to elastically retain said super-relaxed and non-extensible bands of the thread fabric in such conditions when the laminated fabric is in its normal relaxed condition.

9. The method of manufacturing laminated elastic fabric having alternate elastic and substantially non-elastic bands in respect to elongation in the direction of the distances between said bands, said method comprising the steps of stretching under tension a super-relaxing sheet having bands which are alternately elastic and substantially non-elastic in the direction of the tension, adhering a substantially non-extensible but super-relaxable layer of thread fabric to said surface with a layer of rubber adhesive, releasing sufficient tension on said sheet to super-relax the portions of thread fabric adhered to the elastic bands and retaining in a non-extensible condition said thread fabric portion adhered to said substantially non-elastic bands of said surface, drying said rubber adhesive, removing said adhesive while adhered to said fabric from said super-relaxing sheet, and vulcanizing said adhesive to elastically retain said super-relaxed and non-extensible bands of the thread fabric in such conditions when the laminated fabric is in its normal relaxed condition.

10. The method of manufacturing laminated elastic fabric having alternate elastic and substantially non-elastic bands in respect to elongation in the direction of the distances between said bands, said method comprising the steps of stretching under tension a super-relaxing sheet having bands which are alternately elastic and substantially non-elastic in the direction of the tension, applying rubber adhesive to a substantially non-extensible but super-relaxable layer of thread fabric, drying said adhesive to a tacky condition, adhering said layer of thread fabric to said surface with said tacky adhesive, releasing sufficient tension on said sheet to super-relax the portions of thread fabric adhered to the elastic bands and retaining in a non-extensible condition the portions of thread fabric adhered to said substantially non-elastic bands of said surface, drying said adhesive until it is sufficiently strong to hold said layer of thread fabric in its super-relaxed condition, removing said adhesive while adhered to said fabric from said super-relaxing sheet, and vulcanizing said adhesive to elastically retain said super-relaxed and non-extensible bands of the thread fabric in such conditions when the laminated fabric is in its normal relaxed condition.

11. The method of manufacturing laminated elastic fabric having alternate elastic and substantially non-elastic bands in respect to elongation in the direction of the distances between said bands, said method comprising the steps of stretching under tension a surface having bands which are alternately elastic and substantially non-elastic in the direction of the tension, adhering a substantially non-extensible but super-relaxable layer of thread fabric to said surface with a layer of rubber adhesive, releasing sufficient tension on said surface to super-relax the thread fabric adhered to the elastic bands of said surface and retaining in a non-extensible condition said thread fabric portion adhered to said substantially non-elastic bands of said surface, and vulcanizing said adhesive to said surface and to said fabric for the purpose of elastically retaining said super-relaxed and non-extensible bands of the thread fabric in such conditions when the laminated fabric is in its normal relaxed condition.

12. The method of manufacturing laminated elastic fabrics having alternate elastic and non-elastic bands in respect to elongation in the direction of the distances between said bands, said method comprising the steps of subjecting to tension a pair of belts having crosswise bands which are elastic in the direction of the tension alternating with bands which are non-elastic in the direction of the tension so that said corresponding elastic and non-elastic bands in the belts are arranged in matched relation, temporarily securing a surface of separate webs of non-extensible but super-relaxable thread fabric to said belts, adhering the other surfaces of said thread fabric together with rubber adhesive while the elastic and non-elastic bands in the belts are so matched, releasing the tension in the belts, removing said belts from said webs of thread fabric, and vulcanizing said layer of rubber adhesive between said webs.

13. The method of manufacturing laminated elastic fabric having some areas provided with more elastic extensibility than others, said method comprising the steps of reducing the temperature of an elastically extensible rubber composition super-relaxing sheet more in some areas than in others and thereby rendering the lower temperature areas less elastically extensible than the higher temperature areas, subjecting said sheet to tension and extending the more extensible areas a greater extent than the less extensible areas, securing a web of thread fabric to said stretched super-relaxing sheet, releasing a substantial amount of the stretching force and thereby cause the super-relaxing sheet to contract along the lines of stretch and super- relax said thread fabric more in some areas than others, and elastically securing said thread fabric in such super-relaxed condition with elastic rubber bonded thereto.

MERWYN C. TEAGUE.
THOMAS G. HAWLEY, Jr.